United States Patent
Reivo et al.

(10) Patent No.: US 11,780,546 B2
(45) Date of Patent: Oct. 10, 2023

(54) DIVE INFORMATION MANAGEMENT

(71) Applicant: Amer Sports Digital Services Oy, Vantaa (FI)

(72) Inventors: Tuomas Reivo, Vantaa (FI); Lasse Vuorento, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 195 days.

(21) Appl. No.: 17/216,703

(22) Filed: Mar. 30, 2021

(65) Prior Publication Data
US 2021/0300512 A1 Sep. 30, 2021

(30) Foreign Application Priority Data
Mar. 31, 2020 (FI) ..................... 20205326

(51) Int. Cl.
| | |
|---|---|
| *H04W 4/00* | (2018.01) |
| *B63C 11/26* | (2006.01) |
| *H04W 4/021* | (2018.01) |
| *H04W 4/02* | (2018.01) |
| *H04W 4/80* | (2018.01) |
| *H04W 12/50* | (2021.01) |
| *H04W 12/069* | (2021.01) |
| *H04W 4/029* | (2018.01) |
| *B63C 11/02* | (2006.01) |

(52) U.S. Cl.
CPC ............ *B63C 11/26* (2013.01); *H04W 4/021* (2013.01); *H04W 4/027* (2013.01); *H04W 4/029* (2018.02); *H04W 4/80* (2018.02); *H04W 12/069* (2021.01); *H04W 12/50* (2021.01); *B63C 2011/021* (2013.01)

(58) Field of Classification Search
CPC ...... B63C 11/26; H04W 4/021; H04W 4/027; H04W 4/80; H04W 12/50; H04W 12/069; H04W 4/029; H04W 4/02
USPC .......................................... 370/329
See application file for complete search history.

(56) References Cited

U.S. PATENT DOCUMENTS

| | | | |
|---|---|---|---|
| 6,972,715 B2 | 12/2005 | Hollis et al. | |
| 8,275,311 B2 | 9/2012 | Lindman | |
| 8,660,826 B2 | 2/2014 | Leskelä et al. | |
| 10,274,390 B2 * | 4/2019 | Sieber | G01N 33/0036 |
| 10,356,189 B2 * | 7/2019 | Miettinen | H04L 67/12 |

(Continued)

FOREIGN PATENT DOCUMENTS

| | | |
|---|---|---|
| JP | 2010208454 A | 9/2010 |
| WO | WO2019083293 A1 | 5/2019 |

OTHER PUBLICATIONS

SPIERS: Finding the best dive-logging app. divernet.com, Jan. 2020.

*Primary Examiner* — Marceau Milord
(74) *Attorney, Agent, or Firm* — Laine IP Oy

(57) ABSTRACT

According to an example aspect of the present invention, there is provided an apparatus comprising memory configured to store a dive log, at least one processing core configured to receive the dive log from a dive computer, the dive log comprising information concerning a dive, the received dive log not including a location where the dive took place, obtain a geographic location of the apparatus, and add the location where the dive took place to the dive log based at least in part on the geographic location, and/or provide the dive log and the geographic location of the apparatus to a server.

27 Claims, 6 Drawing Sheets

(56) References Cited

U.S. PATENT DOCUMENTS

| | | | |
|---|---|---|---|
| 10,358,199 B1* | 7/2019 | Kleinigger | B63C 11/26 |
| 10,451,437 B2* | 10/2019 | Nieminen | G01L 27/00 |
| 10,555,127 B2* | 2/2020 | Hapola | G01C 17/28 |
| 10,611,445 B1* | 4/2020 | Earl | B63C 11/18 |
| 10,708,723 B2* | 7/2020 | Hapola | G01C 21/1654 |
| 10,874,901 B2* | 12/2020 | Miettinen | G04G 99/006 |
| 2009/0135022 A1* | 5/2009 | Hollis | G01S 19/14 |
| | | | 340/850 |
| 2013/0030701 A1 | 1/2013 | Adams | |
| 2013/0144558 A1* | 6/2013 | Hollis | G01C 13/008 |
| | | | 702/187 |
| 2013/0257621 A1* | 10/2013 | Juergensen | G01C 21/20 |
| | | | 340/626 |
| 2014/0100788 A1 | 4/2014 | Heikkinen et al. | |
| 2014/0177828 A1* | 6/2014 | Loftus | H04L 9/0852 |
| | | | 380/44 |
| 2014/0218322 A1* | 8/2014 | Chung | G06F 3/0446 |
| | | | 345/173 |
| 2015/0071039 A1* | 3/2015 | Rahkonen | H04B 11/00 |
| | | | 367/134 |
| 2015/0071280 A1* | 3/2015 | Ahola | H04J 3/14 |
| | | | 370/349 |
| 2016/0072557 A1* | 3/2016 | Ahola | H04W 4/80 |
| | | | 455/41.1 |
| 2017/0050710 A1 | 2/2017 | Gerges | |
| 2017/0144737 A1* | 5/2017 | Erikson | H04B 13/02 |
| 2017/0183068 A1* | 6/2017 | Lindman | G01S 5/0226 |
| 2018/0195923 A1* | 7/2018 | Sieber | G01N 33/0036 |
| 2018/0327063 A1 | 11/2018 | Ikenoya et al. | |

\* cited by examiner

DIVE INFORMATION MANAGEMENT

FIELD

The present disclosure pertains to management of computerized dive information.

BACKGROUND

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network. The embedded device may be enabled to receive from such a communications network information relating to, for example, a current time and current time zone.

Diving involves descent below a water surface for recreational or professional reasons. A diver, when diving, is immersed in water and relies on holding his breath, or on a breathing apparatus to provide a breathable gas. A diver may use a diving computer to gather information on his dive, such a diving computer may be a standalone apparatus, or it may be a general-purpose computing device programmed to perform the function of a dive computer. A dive computer may record how a depth of the dive changes as a function of time, for example. A dive computer is an example of an embedded computing system.

SUMMARY

According to some aspects, there is provided the subject-matter of the independent claims. Some embodiments are defined in the dependent claims.

According to a first aspect of the present disclosure, there is provided an apparatus comprising memory configured to store a dive log, at least one processing core configured to receive the dive log from a dive computer, the dive log comprising information concerning a dive, the received dive log not including a location where the dive took place, obtain a geographic location of the apparatus, and add the location where the dive took place to the dive log based at least in part on the geographic location, and/or provide the dive log and the geographic location of the apparatus to a server.

According to a second aspect of the present disclosure, there is provided a method in an apparatus, comprising receiving, from a dive computer, a dive log comprising information concerning a dive, the received dive log not including a location where the dive took place, obtaining a geographic location of the apparatus, and adding the location where the dive took place to the dive log based at least in part on the geographic location and/or providing the dive log and the geographic location of the apparatus to a server.

According to a third aspect of the present disclosure, there is provided an apparatus comprising means for receiving, from a dive computer, a dive log comprising information concerning a dive, the received dive log not including a location where the dive took place, obtaining a geographic location of the apparatus, and adding the location where the dive took place to the dive log based at least in part on the geographic location and/or providing the dive log and the geographic location of the apparatus to a server.

According to a fourth aspect of the present disclosure, there is provided a non-transitory computer readable medium having stored thereon a set of computer readable instructions that, when executed by at least one processor, cause an apparatus to at least receive, from a dive computer, a dive log comprising information concerning a dive, the received dive log not including a location where the dive took place, obtaining a geographic location of the apparatus, and add the location where the dive took place to the dive log based at least in part on the geographic location and/or provide the dive log and the geographic location of the apparatus to a server.

According to a fifth aspect of the present disclosure, there is provided an apparatus comprising memory configured to store a dive log, at least one processing core configured to compile the dive log by including information collected by the apparatus during a dive, the information collected during the dive not including a location where the dive takes place, receive from a user device a geographic location, and add the location where the dive takes place to the dive log based at least in part on the geographic location.

According to a sixth aspect of the present disclosure, there is provided an apparatus comprising memory configured to store a dive log, at least one processing core configured to receive the dive log from a dive computer or a user device, the dive log comprising information concerning a dive, the received dive log not including a location where the dive took place, obtain a geographic location of the user device or the dive computer, and add the location where the dive took place to the dive log based at least in part on the geographic location of the user device or the dive computer.

According to a seventh aspect of the present disclosure, there is provided a method comprising storing a dive log in an apparatus, compiling the dive log by including information collected by the apparatus during a dive, the information collected during the dive not including a location where the dive takes place, receiving from a user device a geographic location, and adding the location where the dive takes place to the dive log based at least in part on the geographic location.

According to an eighth aspect of the present disclosure, there is provided a method comprising storing a dive log in an apparatus, receive the dive log from a dive computer or a user device, the dive log comprising information concerning a dive, the received dive log not including a location where the dive took place, obtain a geographic location of the user device or the dive computer, and add the location where the dive took place to the dive log based at least in part on the geographic location of the user device or the dive computer.

EMBODIMENTS

Figure 1:
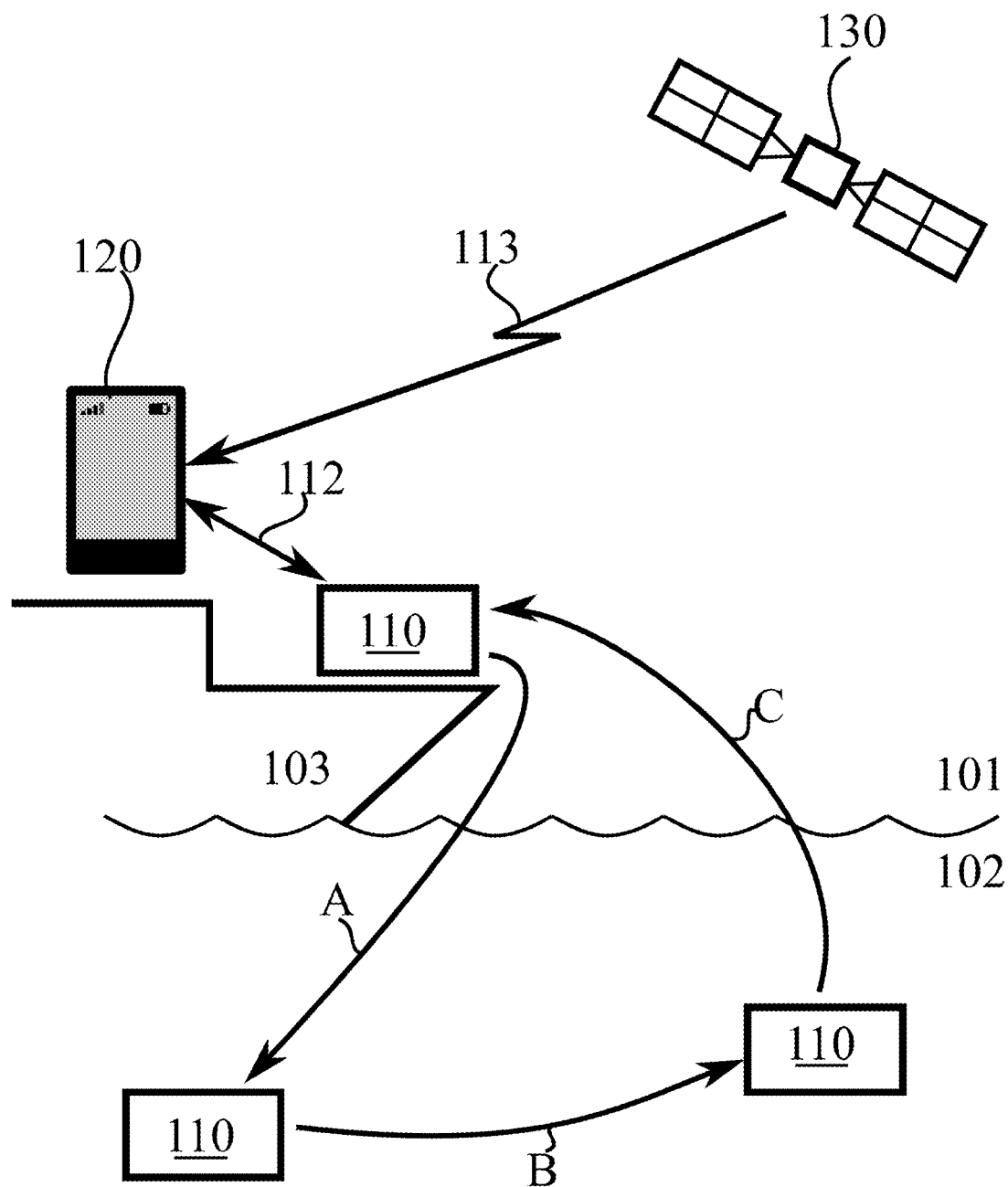
FIG. 1 illustrates an example system in accordance with at least some embodiments of the present invention.

A dive log is a data structure comprising information on a dive. A dive may comprise an underwater dive. A dive computer may lack an ability to determine its location, which may comprise a location in terms of geographic coordinates or in terms of another suitable representation enabling the place where the device is to be understood. The dive log, on the other hand, may benefit from being furnished with a location of the dive, as the dive log may be used afterward for recreational or non-recreational uses. An example of a recreational use is sports diving and its documentation, while an example of non-recreational use is a public safety dive, for example aiming to collect samples to determine if water has been contaminated by chemical weapons leaking from containers on the seabed. It is very useful to know where potentially contaminated water samples were collected from, for example. A dive computer may compile a dive log initially without the location of the dive, including information the dive computer can collect, and subsequently the dive computer, or another user device, may add the location of the dive to the dive log, once the dive computer receives this location from a user device, such as a user device of the user of the dive computer. For example, a smartphone or smart watch are examples of user devices which may be capable of determining their position. The user device is distinct from the dive computer in that the user device is external to the dive computer and the dive computer is external to the user device.

U.S. Pat. No. 8,275,311 discloses a dive computer, wherein an inductive communication method is employed underwater and a higher-frequency radio communication method is used when not submerged in water. This patent discloses not positioning features. U.S. Pat. No. 8,660,826, United States patent application US2014100788A1 and Finnish patent FI126706 disclose dive computer features relating to dive planning on a dive computer. These documents do not disclose positioning methods.

Furnishing a dive computer with satellite positioning capability may be futile, since e.g. GPS signals do not work underwater. Thus the dive computer may be made simpler by omitting a GPS receiver from its structure, and energy may be conserved as satellite positioning circuitry need not be powered. By omitting a GPS receiver, use of materials in constructing the dive computer may be optimized and cost reduced. A GPS receiver would overall not be needed in a dive computer for reasons other than locating a dive, as dive computers are designed for use specifically during dives. Further, satellite reception antennas may even be safety risks in dive computers, since a satellite positioning antenna may interfere with other antennas, such as radio antennas or inductive antennas, of the dive computer. U.S. Pat. No. 6,972,715 discloses a dive computer which comprises a GPS receiver, the dive computer of this document consequently suffering from the drawbacks mentioned above.

FIG. 1 illustrates an example system in accordance with at least some embodiments of the present invention. Illustrated therein is a dive computer 110, which is shown in three places. Initially, dive computer 110 is on a boat 103, from where it moves underwater, arrow "A", as the dive begins. During the dive, dive computer 110 moves underwater, arrow "B". At the conclusion of the dive, the dive computer 110 leaves the water 102 and moves back above the surface 101, for example onto boat 103.

Dive computer 110 may be configured to compile a dive log during the dive, by including in the dive log at least one of the following: time, depth information, pressure information, salinity information, information on ambient light, audio information, video information, magnetic heading information, inertial information, water temperature, air temperature and barometric pressure. A time may be provided from a clock of dive computer 110, for example in the form of a sequence of timestamps stored in the dive log, to indicate when various other items of information were collected for the dive log. Depth information may be obtained from a depth meter, such as a pressure-based depth meter, comprised in dive computer 110. Salinity information may indicate a salinity level of water 102. Salinity information may be determined by a sensor of dive computer 110, or a supplementary sensor of the user, for example, which is in communication with dive computer 110. Information on ambient light or audio information may characterize illumination and sound characteristics of the dive. Ambient light information, for example, may indicate together with depth information how opaque the water is, while audio information may indicate how sound waves are reflected from various layers of water. Video information may be captured from a goggles-mounted camera, for example, to record what the diver has seen during the dive. Magnetic heading and inertial information may be used to understand more precisely, where along a seabed the dive has proceeded, for example. The audio information may comprise a recording of spoken communication by plural divers participating in the dive. Divers may speak underwater, and/or communicate with each other using a wired communication solution. The water temperature and/or the air temperature may be measured using a temperature sensor comprised in dive computer 110. The barometric pressure may be determined using a barometric pressure sensor in dive computer 110, or in a user device paired with dive computer 110, for example. The barometric pressure would be determined above the water before, or after, the dive, to characterize prevailing weather conditions. The barometric pressure sensor may be physically a same sensor as is used to measure depth of a dive underwater.

For example, the dive log may comprise the video information and the depth information. As a further example, the dive log may comprise the time information, the depth information, the audio information and the inertial information. As a yet further example, the dive log may comprise the time information, the video information and the audio information. In general, the dive computer may compile the dive log by including in it information the dive computer collects during the dive. The dive computer may collect this information from sensors comprised in the dive computer, or from additional sensors of the user with which the dive computer is in communication during the dive.

Dive computer 110 may be unfurnished with an ability to determine its location. For example, the dive computer may lack a satellite positioning receiver. Alternatively, the ability of dive computer 110 to determine its location may be switched off or damaged. In these cases, the dive log dive computer 110 may compile during the dive does not include the location where the dive takes place, or took place. The dive log may have a field for indicating this location, but as the dive computer may be unaware of its location, this field may be left unused, at least initially. The dive log may be stored in a memory, such as a random-access memory, of dive computer 110 while it is being compiled during the dive.

A user device 120 may comprise a smartphone, a tablet computer, a laptop computer, a desktop computer, a smart watch, a phablet device or indeed another suitable user device. As one example, the user device may comprise a navigation computer of boat 103. In the example of FIG. 1, user device 120 is equipped with a satellite positioning receiver, configured to receive signals from a satellite positioning constellation 130. The satellite positioning mechanism is an example of a method for determining the geographic location of user device 120. While a single satellite is illustrated in FIG. 1 for the sake of clarity, in actual use satellite positioning constellations typically comprise plural satellites. Examples of satellite positioning constellations include the global positioning system, GPS, and the Galileo positioning constellation. Signals 113 from satellite positioning constellation 130 enable user device 120 to determine its geographic location, for example in terms of geo-coordinates or with reference to a predefined map. Satellite positioning may operate independently of, for example, a cellular network, wherefore a geographic location of user device 120 may be determined using a satellite positioning method also outside of cellular communication network coverage. This is advantageous, as diving often takes place outside cellular coverage.

User device 120 may alternatively, or additionally, be furnished with a different method for determining its geographic location. Examples of such alternative methods include a beacon-based positioning method, a cellular communication network-based positioning method and a mesh networking based positioning method.

After the dive has ended, dive computer 110 may communicate with user device 120. Such a communication interface is illustrated in FIG. 1 as interface 112.

Interface 112 may be a short-range interface, such as near-field communications, NFC, or Bluetooth. Wireless local area network, WLAN, connections may also be used. Where interface 112 is short-range, the location of dive computer and user device 120 is the same since the two devices may be at most the short range apart. Short range in this context refers to a range of at most 10-20 meters, for example. A communication connection may be formed over the interface, wherein the communication connection may comprise a protocol connection, which may comprise packet-based information exchange. An example protocol is transmission control protocol, TCP, but a less formal connection is also possible. The interface, and the communication connection, may be wired or at least in part, or in whole, wireless.

Dive computer 110 may receive from user device 120 a geographic location, such as a geographic location of user device 120 that user device 120 has determined using one or more methods user device 120 has to determine its geographic location. Dive computer 110 may be configured to add a location of the dive to the dive log, such that the location of the dive is based, at least in part, on the received geographic location. Alternatively, dive computer 110 may provide the dive log without the location of the dive to user device 120, which may add the location of the dive to the dive log. In some embodiments, dive computer 110 provides the dive log, without the location of the dive, to user device 120 and received the geographic location of user device 120 from user device 120. The dive computer may then add the geographic location of user device 120 as the location of the dive into a copy of the dive log it keeps locally, and user device 120 may add the location of the dive to the dive log.

When dive logs are furnished with indications of the locations of the respective dives, planning future dives is made more effective and dive safety is enhanced. For example, dive log information may be provided to a cloud service, where heat maps associating dive features with dive locations may be generated. The location of the dive may be reduced in accuracy, as will be described below, before providing the dive log, or information from the dive log, to the cloud service. For example, the heat maps may indicate that dangerous currents have been observed in a certain area. Precise locations of previous dives are not necessary for generation of a heat map which enables planning future dives to avoid the area where dangerous currents have been observed. Thus privacy of divers, and safety of future divers, are both obtained. The heat maps may further provide information on temperature variations of water, maximum depths and caves, based on information concerning these in dive logs provided to the cloud service.

The location of the dive that user device 120 or dive computer 110 adds to the dive log may be the geographic location of user device 120. In some embodiments, user device 120 or dive computer 110 modifies the geographic location of user device 120 before including it in the dive log as the location of the dive, for example the accuracy of the geographic location of user device 120 may be reduced before it is included as the location of the dive in the dive log. This may serve a purpose of protecting privacy of the user, in the event that dive logs are shared.

Where dive computer 110 adds the location, dive computer 110 may be configured to upload the dive log to user device 120, or to another user device, after it has added the location of the dive to the dive log. Where dive computer 110 is configured to upload the dive log to user device 120, it may upload the dive log during the same communication connection as was used in providing the geographic location of user device 120 to dive computer 110, for example. In this case, the communication connection need only be established once, which beneficially saves signalling events and time.

In some embodiments, user device 120 is configured to receive, in addition to obtaining the geographic location of user device 120, a second geographic location from a further device. In these embodiments, user device 120 may compute an average value of the geographic location and the second geographic location, and determine the location of the dive for inclusion in the dive log based on this average. For example the average itself may be used as the location of the dive, or the average may be reduced in accuracy before using it as the location of the dive in the dive log. The further device may be a second user device or another kind of device. The second geographic location may be received over a short-range interface. Both the geographic location and the second geographic location may be received over short-range interfaces.

User device 120 may be configured to accept a geographic location for use in determining the location of the dive only from a user device with which user device 120 has previously been paired. This may serve the benefit, that a malicious user device of another user cannot provide an incorrect geographic location to corrupt the dive log. User device 120 may store in its memory information concerning user devices with which it has been paired in the past. In case no user device with which user device 120 has been paired in the past is available during a preconfigured time period after an end of the dive, the user device, or dive computer, may be configured to prompt the user to provide the location of the dive, for example.

Dive computer 110 or user device 120 may be configured to include in the dive log an indication of a length of time elapsing between the end of the dive and the communication of the dive log to user device 120 from the dive computer. User device 120 may automatically determine the time of the end of the dive, from timestamps or other time information included in the dive log. This delay may be referred to as a location delay. The location delay may alternatively be determined as a delay from the end of the dive to the obtaining of the geographic location of user device 120. User device 120 may determine when the dive ended from information in the dive log, for example the dive log may have a start time of the dive and an end time of the dive. Alternatively, where the dive log comprises timestamped data, the timestamps may be used to determine when the dive ended. This may be used later on to assess how accurate the location in the dive log is, since if a longer time period elapses, the dive computer and/or user device may be moved about after the end of the dive before the geographic location of the user device is obtained. User device 120 may be configured to reduce the accuracy of the geographic location the more, the longer is the time elapsing between the end of the dive and the receiving of the dive log from dive computer 110. In other words, user device 120 may be configured to include a more accurate location of the dive in the event the geographic location that the location of the dive is determined based on is received sooner after the end of the dive. Reducing the accuracy more may comprise replacing the exact geographical location with a larger geofence area, for example. Reducing the accuracy less may comprise replacing the exact geographical location with a smaller geofence area, for example. Where a geofence area is used to account for location delay, the geofence area may be a circular area with the geographic location at its center. Where a geofence area is used to mask the exact dive location for privacy reasons, the geofence area may be an area which includes the geographic location somewhere within its area, but not at the centre.

Dive computer 110 may comprise at least one inertial sensor, and the dive computer may be configured to compute an estimate of how the dive computer has moved after the ending of the dive and before sending the dive log to user device 120, the estimate being based on data obtained from the at least one inertial sensor, the location of the dive being based at least in part on the estimate. Examples of inertial sensors include accelerometers and gyroscopes, which may be used to determine changes in orientation and state of motion of dive computer 110. For example, dive computer 110 may comprise an inertial measurement unit configured to produce inertial sensor data usable in reconstructing a movement path of dive computer after the end of the dive. When the end of the movement path is set to the geographic location received from or obtained in user device 120, the beginning of the movement path may be used as an estimate of the location of the dive. This estimate may then be included in the dive log, optionally alongside an indication of the location delay. At least one inertial sensor among the at least one inertial sensor may comprise magnetic field sensors, enabling a determination concerning a direction, or directions, in which dive computer 110 has moved.

In some embodiments a server-based solution is implemented, wherein user device 120 conveys the dive log from dive computer 110 to a server, the conveyed dive log not comprising the location of the dive. The server may then obtain the geographic location of user device 120, for example by querying it from user device 120, or by invoking a network-based positioning method in case user device 120 has a cellular communications capability. The server may then insert the location of the dive to the dive log based at least partly on the geographic location of user device 120, as described herein. The user may access the dive logs, which comprise the location of the dive as determined by the server based on the geographic location of user device 120, using the user device 120. The user may use a dedicated dive log management application in user device 120, or the server may provide the dive logs for access to the user via a web browser user interface, for example. The dive logs may be communicated between the server and user device 120 in encrypted form. When accessing the dive logs, this encrypting may be based on a shared secret, for example, the encrypting when accessing the dive logs may use a symmetric encryption key derived from an identity of the dive computer. This identity is known to both the user device and to the server. For example, the identity of the dive computer may be comprised in the dive log, and/or the user device may store this identity as part of pairing information it has concerning the dive computer.

Figure 2:
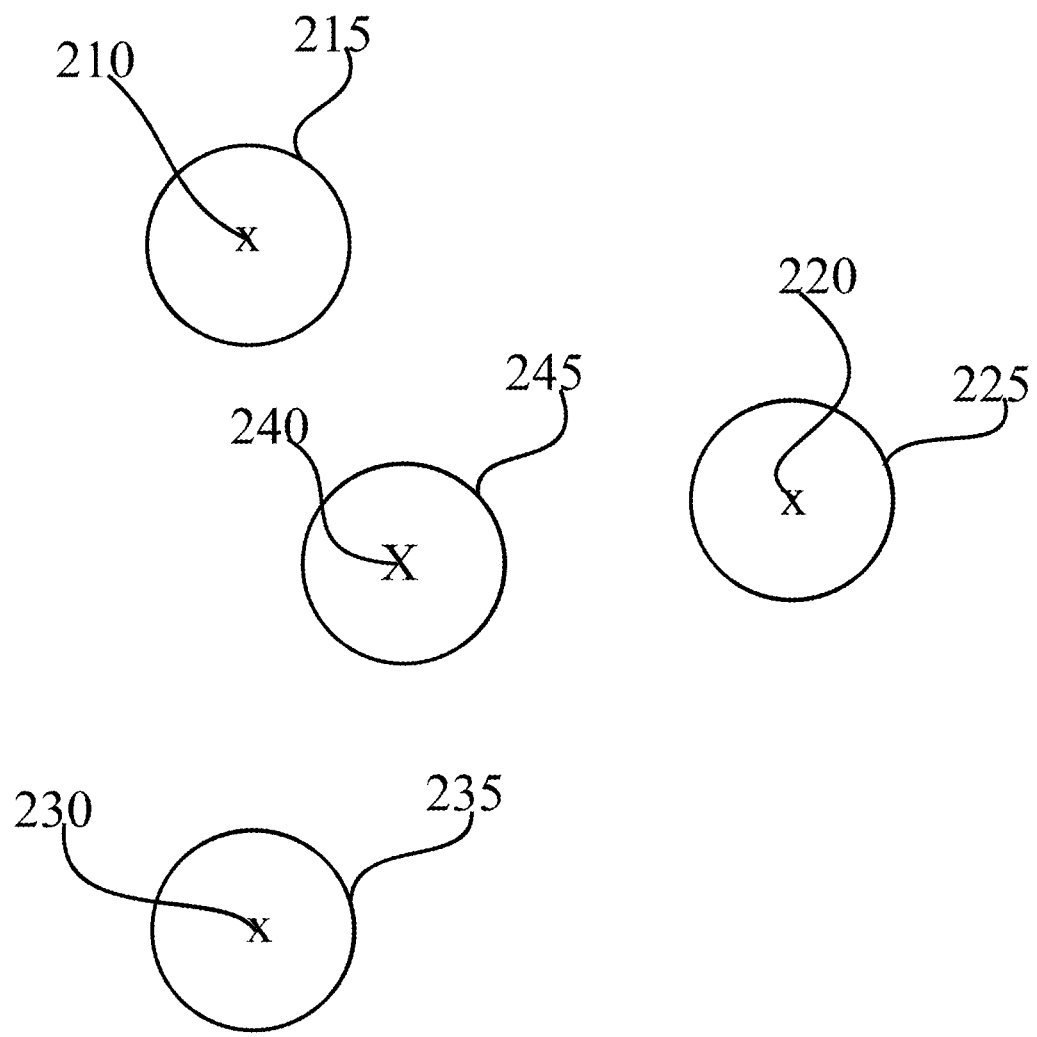
FIG. 2 illustrates obtaining an average of plural geographic locations.

FIG. 2 illustrates obtaining an average of plural geographic locations. In the illustrated example, a user device or dive computer has obtained three geographic locations, for example from three user devices, or from one user device and two other devices.

Geographic locations 210, 220 and 230 are received from individual ones of the three devices, and represent estimated these devices have obtained for their respective locations. For example, in case the dive ends on a boat, all the devices will be on the same boat and thus in the same location. The difference between geographic locations 210, 220 and 230 therefore represents largely measurement error. Locations 215, 225 and 235 are reduced-accuracy versions of geographic locations 210, 220 and 230. Accuracy may be reduced by shifting the geographic location within the reduced-accuracy range or by assigning a geofence instead of a specific location as the geographic location. A geofence is a two-dimensional area, defined by its edge which encloses the two-dimensional geofence area. A location indicated as a geofence indicated not a specific point, but an area wherein the exact location is understood to be, but the exact location within the geofence is not identified. The area may be indicated by indicating the edge enclosing the area, for example.

Geographic location 240 is an average value of geographic locations 210, 220 and 230 and location 245 is a reduced-accuracy version of geographic location 240. The accuracy may be reduced by replacing geographic location 240 with a geofence which includes geographic location 240 or by shifting geographic location 240 within a desired accuracy, for example. Where a user device or diving computer receives the three geographic locations 210, 220 and 230, it may determine the location of the dive for inclusion in the dive log as either the average value, geographic location 240, or as the reduced-accuracy version 245 of geographic location 240, for example.

Figure 3:
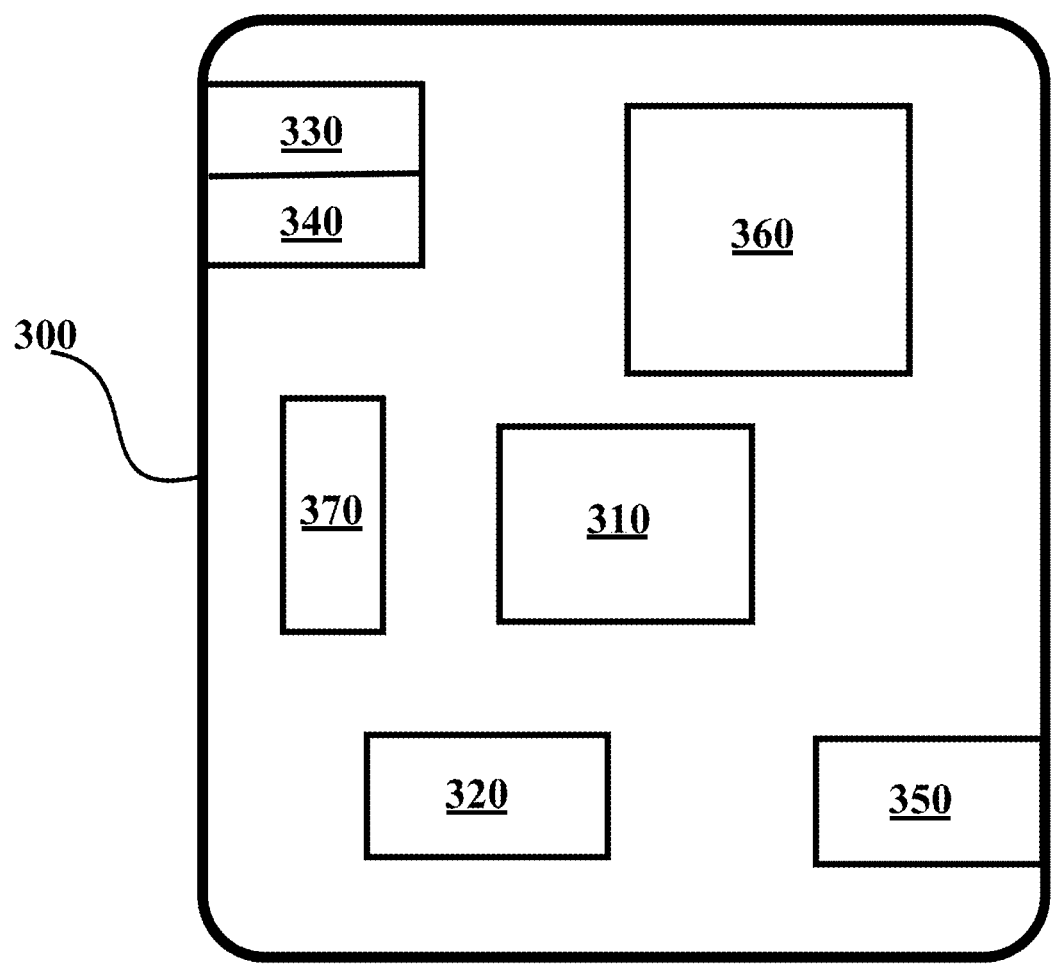
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as dive computer 110 or user device 120 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions such as compiling, receiving and adding, for example.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
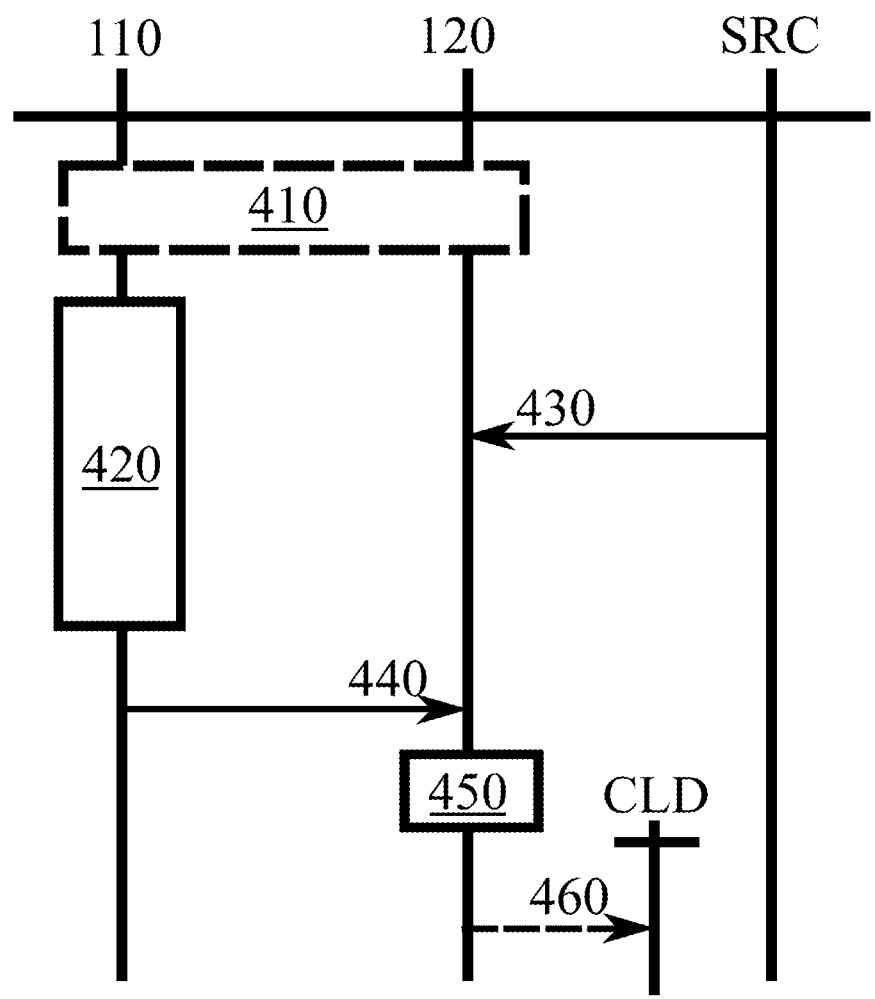
FIG. 4 illustrates signalling in accordance with at least some embodiments of the present invention.

FIG. 4 illustrates signalling in accordance with at least some embodiments of the present invention. On the vertical axes are disposed, from the left, dive computer 110 and user device 120 of FIG. 1, and on the right, a positioning information source SRC. Time advances from the top toward the bottom. The source SRC may comprise a satellite positioning constellation, such as GPS or Galileo, or a cellular communication network, for example. Source SRC enables user device 120 to determine its position.

In phase 410, dive computer 110 and user device 120 are paired together, by which it is meant they are associated with each other. For example, the pairing may comprise a Bluetooth pairing, or dive computer 110 and user device 120 may more generally be provided with identifiers of each other. A cryptographic process may be used in the pairing to ensure the devices are really those identified by the identifiers, wherein such a cryptographic process may be based on signed cryptographic certificates, for example. Phase 410 is optional in the sense that it is not present in all embodiments.

Phase 420 is the dive, wherein dive computer 110 is taken with the user underwater. During the dive, as described herein above, dive computer 110 compiles the dive log by including information which, however, does not yet include the location.

In phase 430, user device 120 received positioning information from source SRC. This enabled user device 120 to determine its geographic location. Phase 430 need not take place strictly during the dive, as illustrated, rather, phase 430 may in general take place between user device 120 and source SRC to enable the user device to determine its geographic location. For example, user device 120 may periodically receive the positioning information from source SRC, or user device may receive it responsive to a request sent from user device 120. For example, the user device may request the positioning information responsive receiving the dive log from dive computer 110 after the dive.

In phase 440, dive computer 110 provides the dive log, without the location of the dive, to user device 120. User device 120 may be configured to only accept a geographic location from a dive computer with which user device 120 has previously been paired with. The dive log may be sent over a communication connection between dive computer 110 and user device 120. The communication connection may be wired or wireless. The communication connection may be formed over a Bluetooth interface, for example. The communication connection may be a TCP connection, for example. In particular, the communication connection may be a TCP connection formed over a Bluetooth interface between dive computer 110 and user device 120. The communication connection may be short-range.

In phase 450, user device 120 adds the location to the dive log based at least in part on the geographic location of user device 120. As described above, the location may be the geographic location, or user device 120 may process the geographic location to obtain the location to add to the dive, for example by reducing the accuracy of the geographic location by replacing the geographic location with a geofence which encloses the geographic location.

In optional phase 460, user device 120 uploads the dive log, which now includes the location, to cloud service CLD. In some embodiments, the cloud service CLD, for example a server of the cloud service, is the entity which enters the location of the dive into the dive log, once it has been provided the dive log without this location, and the geographic location of the user device and/or the dive computer. A cloud service, CLD, based solution may be beneficial in simplifying a software of the user device and/or the dive computer. This in turn reduces the amount of memory that these devices need to be equipped with. User devices such as smartphones, for example, are frequently cluttered with applications which take up storage capacity of these devices as well as draining the battery faster than is necessary. It is in the interest of the user that applications in his device take up as little memory, and consume as little current, as necessary. In dive computers in particular, a simpler software suite makes the product more usable, extends battery life and simplifies the structure in terms of memory size. Simplified user device software and/or dive computer software also reduces the time it takes to develop these products before release to the market.

Figure 5:
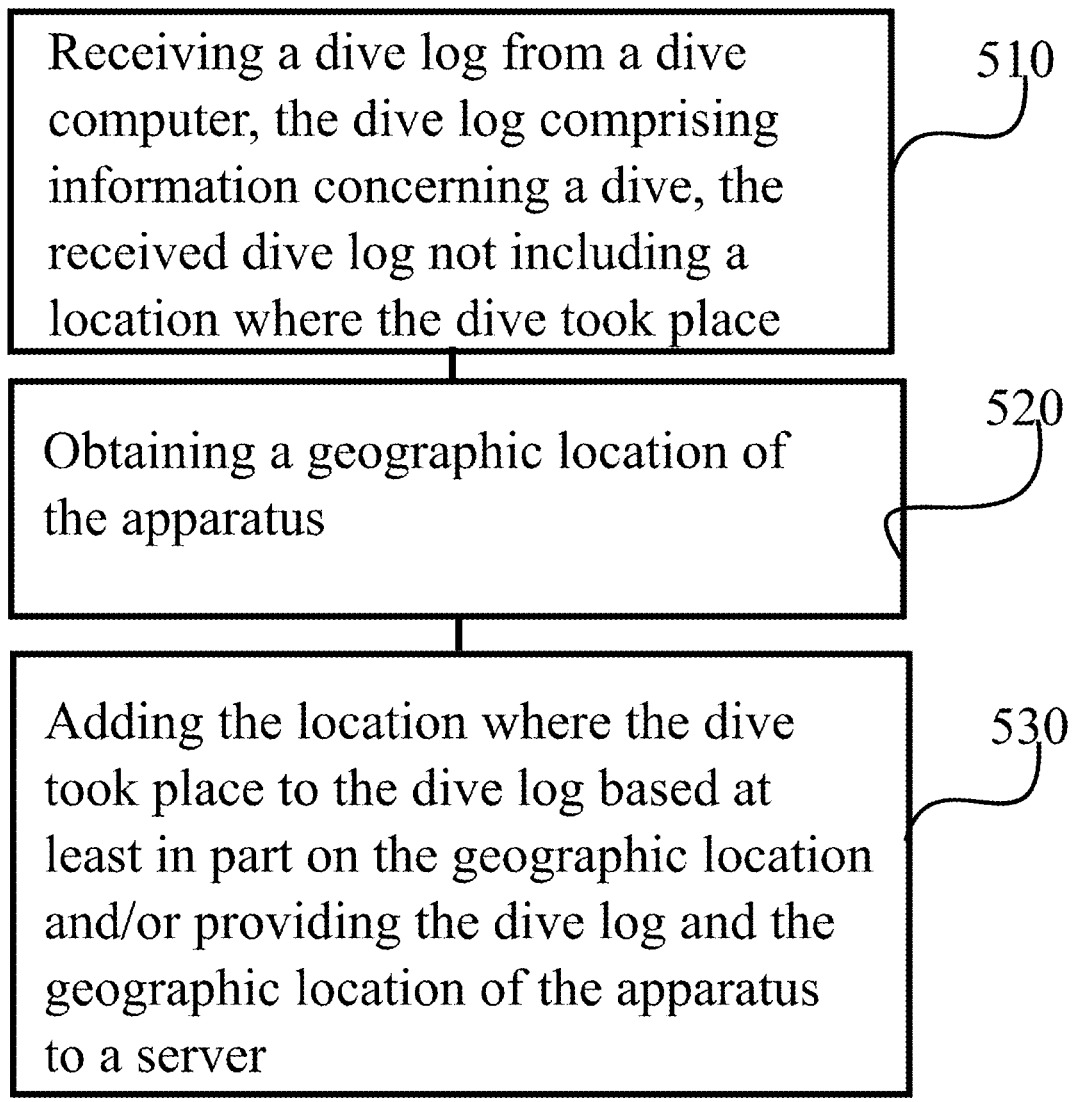
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises compiling a dive log by including information collected by the apparatus during a dive, the information collected during the dive not including a location where the dive takes place. Phase 520 comprises receiving from a user device a geographic location. Finally, phase 530 comprises adding a location to the dive log based at least in part on the geographic location and/or providing the dive log and the geographic location of the apparatus to a server. In other words, the method may comprise adding the location in the apparatus performing the method, and/or the method may comprise providing the dive log and the geographic location to a server, enabling the server to add the location of the dive to the dive log. The method may further comprise forming a communication connection with the user device, before receiving the geographic location from the user device.

Figure 6:
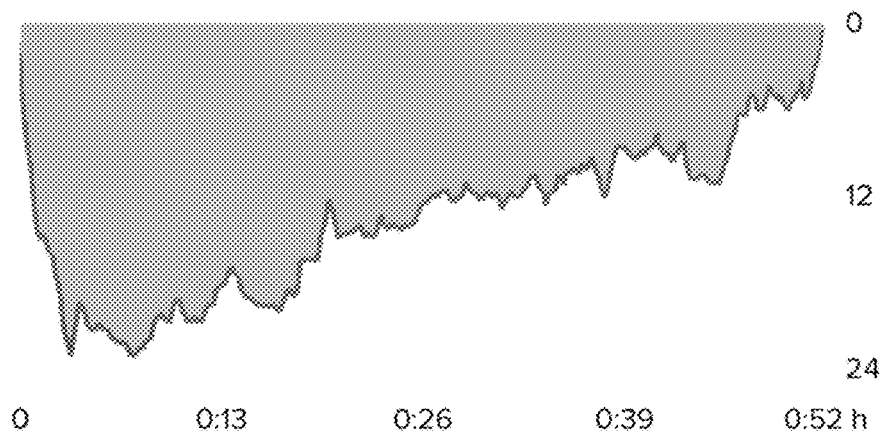
FIG. 6 is a visualization of an example dive log.
Figure 6:
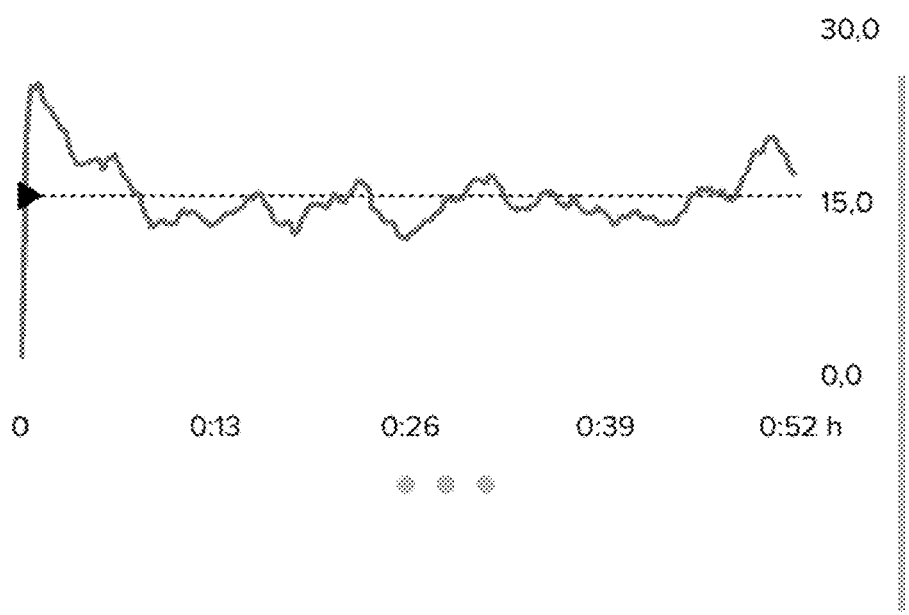

FIG. 6 is a visualization of an example dive log. The visualized example dive log includes timestamped information on a depth of the dive and diving gas consumption during the dive, as a function of time.

In some embodiments of the invention, the dive computer 110 is configured to compile the dive log by including information collected by the apparatus during a dive, the information collected during the dive not including a location where the dive takes place, to receive from a user device a geographic location, and to add the location where the dive takes place to the dive log based at least in part on the geographic location. The dive computer may process the geographic location as described herein above for the user device before adding it to the dive log as the location where the dive took place. The geographic location may be the geographic location of the user device.

The dive computer may receive the geographic location from the user device before and/or after the dive. For example, as the user configures a dive into the dive computer before the dive, the dive computer may query the geographic location from the user device. Alternatively or additionally, the dive computer may be configured to query for the geographic location from the user device after surfacing, when it determines it is in possession of a dive log which does not have a location where the dive took place.

In some embodiments, the dive computer may receive the geographic location from the user device both before and after the dive. In these cases, the dive computer may be configured to verify these geographic locations differ by at most a preconfigured threshold deviation from each other, such as one or three kilometres, for example. In case the geographic locations differ by more than the deviation, the dive computer may query the user for the location where the dive took place. In case the deviation is less than the preconfigured threshold deviation, the dive computer may enter an average value of the received geographic locations into the dive log as the location where the dive took place.

After the dive, the dive computer may be configured to provide the dive log to the user device and/or a server after adding the location where the dive took place to the dive log.

In some embodiments of the invention, a server, such as, for example, a cloud service provider server, is configured to receive the dive log from a dive computer or a user device, the dive log comprising information concerning a dive, the received dive log not including a location where the dive took place, to obtain a geographic location of the user device or the dive computer, and to add the location where the dive took place to the dive log based at least in part on the geographic location. The server may obtain more than one geographic location.

In some embodiments the server is configured to query from a cellular network for the geographic location of the user device, and to thereby obtain the geographic location from a cellular network for use in adding the location where the dive took place to the dive log. To enable this, the server may be pre-provided with a permission, such as a token, to enable requesting the geographic location of the user device from the cellular network. In these networks the user device may comprise a device with cellular communications capability, such as a cellular phone or tablet computer, for example.

In some embodiments where the server adds the location of the dive to the dive log, user device 120 is configured to store at least one dive log it has received from at least one dive computer while user device 120 lacks a data connection to the server. User device 120 may be configured to store in a memory internal to user device 120 this dive log, or dive logs, until user device 120 is within coverage of a cellular network or a preconfigured WLAN network, for example. Further, user device 120 may be configured to store in a buffer in a memory internal to user device 120 a sequence of timestamped geographic locations of itself. User device 120 may determine these geographic locations using satellite positioning, for example. User device 120 may be configured to begin compiling the sequence of these timestamped geographic locations responsive to leaving a coverage area of a cellular network, for example. Alternatively, user device 120 may be configured to keep a sequence of timestamped geographic locations of itself all the time, replacing oldest geographic locations with new ones to keep a buffer covering two or four most recent 24-hour time periods, for example. The server may determine from information in the dive log it receives, when the dive took place and to request, over a data connection between itself and user device 120, user device 120 to provide a geographic location of user device 120 at this determined time of the dive, which the server specifies in the location request message it transmits to user device 120. In response, user device 120 may retrieve its geographic location at the specified time from the sequence of timestamped geographic locations it has, and provide this geographic location to the server as a response to the location request. In particular, the server may be configured to determine the time of the dive as being during the dive as an average value of the start of the dive and the end of the dive, that is, a temporal midpoint of the dive. As user device 120 is in the boat, it may keep compiling the sequence of timestamped geographic locations of itself while the dive progresses. The sequence may comprise one geographic location per minute or one geographic location per five minutes, for example.

In some embodiments, the server receives the dive log from dive computer 110, such that the dive log is not sent from dive computer 110 via user device 120. In these embodiments, dive computer 110 may have a data connection of its own, such as a WLAN or cellular connection, for example, and it may provide the dive log responsive to arrival within a coverage area of its data connection, for example. The server may then request the sequence of timestamped geographic locations of user device 120 from user device 120, and obtain the location of the dive from the sequence, using timing information comprised in the dive log. User device 120 may be a smart watch, for example. In other words, the server may be configured to receive the dive log from dive computer 110 directly, not via user device 120, and to receive a sequence of timestamped geographic locations of user device 120 from user device 120, and to obtain the location of the dive from the sequence of geographic locations, using timing information comprised in the dive log.

The sequence of timestamped geographic locations user device 120 may be used also, or alternatively, in embodiments which do not have the server, in the event a communication connection between dive computer 110 and user device 120 is not formed promptly after the dive. In these cases, user device 120 may rely on the timestamped sequence of geographic locations of user device 120 to obtain therefrom the location of the dive, for inclusion in the dive log user device 120 receives from dive computer 110 in a state in which the dive log does not comprise the location of the dive. This is based on an assumption, which is reasonable, that dive computer 110 and user device 120 are co-moving after the dive. This may be so, as they are expected to move together with the user first on the boat, then e.g. by car. User device 120 may use the sequence as is described above for the server, by matching the timestamps with time information in the dive log and, optionally, by averaging the start and end of the dive to obtain the time, and thus location, of the dive from the sequence. In some embodiments, user device 120 is configured to obtain the sequence of timestamped geographic locations from a second user device, for example of the same user, with which user device 120 may be paired. While this sequence, obtained by the second user device, characterizes the geographic location of the second user device, in case the second user device may be assumed to be co-moving, for example together with the user, the sequence is usable also for user device 120 and, by extension, the dive computer and the dive. In such cases the second user device may be a smart watch, for example arranged to compile an activity session including location monitoring, and user device 120 may comprise a smartphone, for example. User device 120 need thus not necessarily be co-moving with the user.

The server may be configured to provide, for example responsive to request, the dive log to at least one of the dive computer and the user device after adding the location where the dive took place to the dive log.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in management of dive information.

ACRONYMS LIST

GPS global positioning system
TCP transmission control protocol
WLAN wireless local area network

| REFERENCE SIGNS LIST | |
|---|---|
| 110 | dive computer |
| 120 | user device |
| 130 | satellite positioning constellation |
| 112 | interface |
| 113 | signals (positioning information) |
| 210, 220, 230, 240 | geographic locations |
| 215, 225, 235, 245 | reduced-accuracy versions of geographic locations |
| 300-370 | structure of the device of FIG. 3 |
| 410-460 | phases of signalling in FIG. 4 |
| 510-530 | phases of the method of FIG. 5 |

The invention claimed is:

1. An apparatus comprising: memory configured to store a dive log; and at least one processing core configured to: receive the dive log from a dive computer over a short range wireless connection, the dive log comprising information concerning a dive, the received dive log not including a location where the dive took place; obtain a geographic location of one of: the apparatus or the dive computer, and add the location where the dive took place to the dive log based at least in part on the geographic location, and/or provide the dive log and the geographic location of the apparatus to a server, wherein the apparatus is configured to use an estimate, based on inertial sensor data, of how the dive computer has moved after ending the dive and before providing the dive log to the apparatus, the apparatus being configured to perform the adding of the location where the dive took place based at least in part on the estimate, the estimate and/or the inertial sensor data being comprised in the dive log.

2. The apparatus according to claim 1, wherein the apparatus comprises a satellite positioning receiver, and the apparatus is configured to obtain the geographic location using the satellite positioning receiver.

3. The apparatus according to claim 1, wherein the apparatus is configured to upload the dive log to a cloud service after adding the location where the dive took place to the dive log.

4. The apparatus according to claim 1, wherein the apparatus is configured to upload the dive log to a second apparatus after adding the location where the dive took place to the dive log.

5. The apparatus according to claim 1, wherein the apparatus is configured to receive a second geographic location from a further device, and to include in the dive log the location where the dive took place based at least in part on the second geographic location.

6. The apparatus according to claim 1, wherein dive log is received from the dive computer and the apparatus is configured to accept the dive log from the dive computer only in case the apparatus has previously been paired with the dive computer.

7. The apparatus according to claim 1, wherein the apparatus is further configured to reduce an accuracy of the geographic location before using the geographic location to add the location where the dive took place to the dive log.

8. The apparatus according to claim 1, wherein the information concerning the dive comprises at least one of the following: time, depth information, pressure information, salinity information, information on ambient light, audio information, video information, magnetic heading information, inertial information, water temperature, air temperature and barometric pressure.

9. The apparatus according to claim 1, wherein the apparatus is configured to perform the providing of the dive log and the geographic location of the apparatus to the server, and wherein the apparatus is subsequently configured to receive the dive log, at least in part, from the server in encrypted form, the encrypted form being based on an encryption key derived from an identity of the dive computer.

10. The apparatus according to claim 1, wherein the apparatus is further configured to store the dive log while the apparatus lacks a data connection to the server, and to provide the dive log to the server responsive to the data connection becoming available.

11. The apparatus according to claim 1, wherein the apparatus is further configured to provide the dive log to at least one of a user device and the dive computer after adding the location where the dive took place to the dive log.

12. The apparatus according to claim 11, wherein the apparatus is configured to perform the providing by providing the dive log to at least one of the user device and the dive computer in encrypted form, the encrypted form being based on an encryption key derived from an identity of the dive computer.

13. The apparatus of claim 1, wherein the dive log is received form the dive computer.

14. The apparatus of claim 1, wherein the geographic location is a geographic location of the apparatus.

15. A method in an apparatus, comprising: receiving, from a dive computer, over a short range wireless connection, a dive log comprising information concerning a dive, the received dive log not including a location where the dive took place; obtaining a geographic location of the apparatus, and adding the location where the dive took place to the dive log based at least in part on the geographic location and/or providing the dive log and the geographic location of the apparatus to a server, and including in the dive log an indication of how much time has elapsed between ending of the dive and the receiving of the dive log from the dive computer, wherein the method comprises using an estimate, based on inertial sensor data, of how the dive computer has moved after ending the dive and before providing the dive log to the apparatus, wherein the adding of the location where the dive took place is based at least in part on the estimate, the estimate and/or the inertial sensor data being comprised in the dive log.

16. The method according to claim 15, wherein the apparatus comprises a satellite positioning receiver and the method comprises obtaining the geographic location using the satellite positioning receiver.

17. The method according to claim 15, further comprising uploading the dive log to device cloud service after adding the location where the dive took place to the dive log.

18. The method according to claim 15, further comprising uploading the dive log to a second apparatus after adding the location where the dive took place to the dive log.

19. The method according to claim 15, further comprising receiving a second geographic location from a further device, and including in the dive log the location where the dive took place based at least in part on the second geographic location.

20. The method according to claim 15, further comprising accepting the dive log from the dive computer only in case the apparatus has previously been paired with the dive computer.

21. The method according to claim 15, further comprising reducing an accuracy of the geographic location before using the geographic location to add the location where the dive took place to the dive log.

22. The method according to claim 15, wherein the information concerning the dive comprises at least one of the following: time, depth information, pressure information, salinity information, information on ambient light, audio information, video information, magnetic heading information inertial information, water temperature, air temperature and barometric pressure.

23. A non-transitory computer readable medium having stored thereon a set of computer readable instructions that, when executed by at least one processor, cause an apparatus to at least perform the method of claim 13.

24. An apparatus comprising: memory configured to store a dive log; and at least one processing core configured to: compile the dive log by including information collected by the apparatus during a dive, the information collected during the dive not including a location where the dive takes place; receive, after the dive, over a short range wireless communication connection, from a user device a geographic location, and add the location where the dive takes place to the dive log based at least in part on the geographic location, wherein the apparatus is configured to receive the geographic location both before the dive and after the dive, and to verify the geographic location received after the dive differs by at most a preconfigured threshold deviation from the geographic location received before the dive.

25. The apparatus according to claim 24, wherein the apparatus is further configured to provide the dive log to the user device or to a server after adding the location where the dive took place.

26. The apparatus according to claim 25, wherein the apparatus is configured to perform the providing of the dive log to the user device or to the server using a same communication connection as is used to receive the geographic location.

27. The apparatus according to claim 24, wherein the apparatus is a dive computer.

* * * * *